United States Patent [19]

Carcich, Jr.

[11] Patent Number: 5,791,620

[45] Date of Patent: Aug. 11, 1998

[54] MOUSE PAD METHOD

[76] Inventor: John Carcich, Jr., 671 Joette St., Gardnerville, Nev. 89410

[21] Appl. No.: 763,842

[22] Filed: Nov. 22, 1996

[51] Int. Cl.⁶ .................................................. A47B 91/00
[52] U.S. Cl. .................................. 248/346.01; 40/773
[58] Field of Search ........................ 248/346.01; 40/358, 40/594, 772, 773; 345/163, 156

[56] References Cited

U.S. PATENT DOCUMENTS 3,581,423  6/1971  Mascolo ........................ 40/773 X
4,711,347  12/1987  Drexler et al. ................. 40/772 X
4,799,054  1/1989  House ........................... 345/163
5,022,170  6/1991  House ........................... 40/358

*Primary Examiner*—Ramon O. Ramirez
*Attorney, Agent, or Firm*—Herbert C. Schulze

[57] ABSTRACT

A computer mouse pad and method for making it comprising a base of non skid material, a hard surface material bonded to the top of the non skid material, a slotted three sided frame cut into said materials, a transparent mouse operating material fastened to the frame, and a calendar or the like placed on the hard surface material beneath the transparent material.

1 Claim, 2 Drawing Sheets

FIG. 3
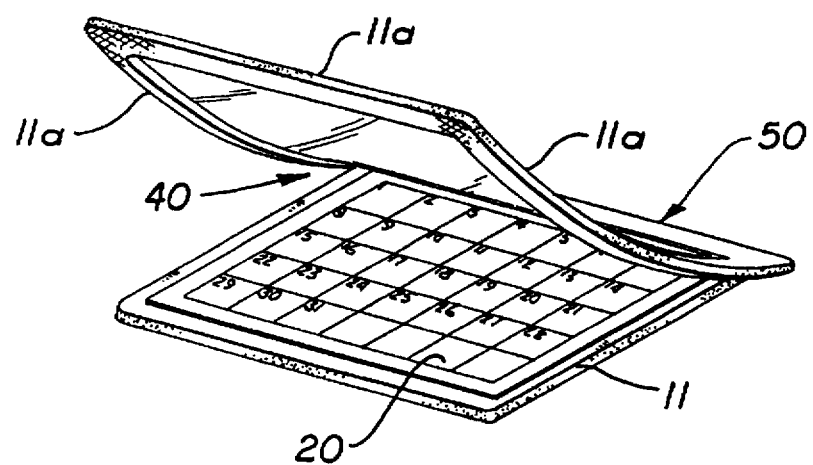
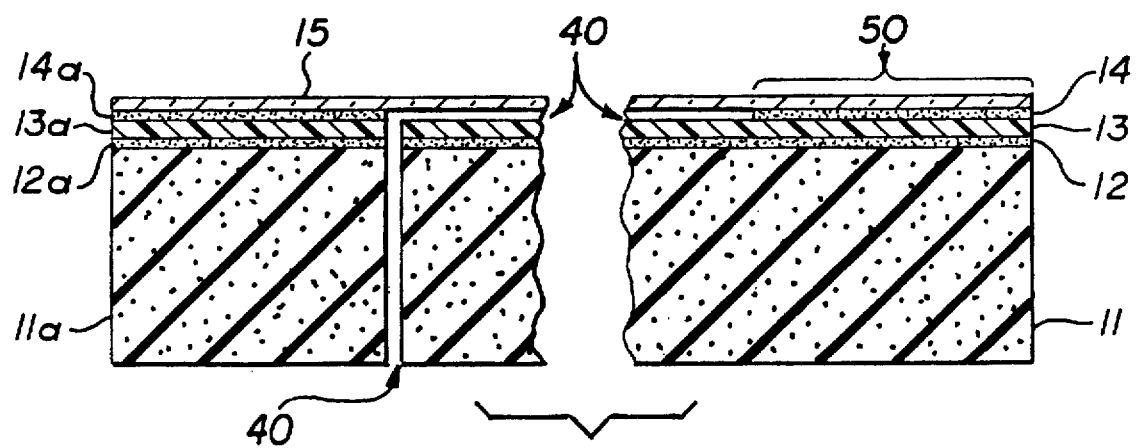
FIG. 4

MOUSE PAD METHOD

CROSS REFERENCE TO RELATED PATENT APPLICATIONS

There are no patent applications filed by me related to the within application.

BACKGROUND OF THE INVENTION

I. Field of the Invention

This invention is in the general field of computer accessories;

The invention is even more particularly directed to pads utilized for computer mouse utilization;

The invention is even more especially directed to mouse pads including special construction for inclusion of replaceable useful data such as calendars or the like.

II. Description of the Prior Art

There are many computer mouse pads. Most computer mouse pads are merely a sheet of rubber or plastic. Such pads are entirely different from the invention disclosed herein. I am aware of two patents (one is a continuation in part of the other) which purport to provide computer mouse pads with informational displays which, upon an initial viewing, may seem to be somewhat akin to my invention. The two patents concerned are both by V. Dean House and are numbered 4,799,054 and 5,022,170. These patents are different from my invention as will become apparent to those skilled in the art.

SUMMARY OF THE INVENTION

Computer mice are in very wide use. A computer mouse is a device which normally has a ball on its underside with a body which can be moved on a flat surface to cause the ball to rotate, and thus move a cursor, pointer, or the like on a monitor screen. The mouse will generally have one or more switches which can be used to activate certain computer functions.

The surface upon which the mouse is operated is most important. Many surfaces are not ideally suited to operation of a mouse. Rough, scratched, or damaged areas of a surface will interfere with optimum mouse control and functioning.

As a result, special mouse pads are widely used. Most pads are sheets of rubber, plastic or the like. A properly useable mouse pad should have a bottom surface to be placed on a working area such as a desk, a table, or the like which surface will not slide on the working area. The top surface of the mouse pad should have a surface which will allow the hand and various parts of the mouse body to slide easily, but at the same time will give sufficient resistance that the mouse tracking ball will rotate freely when moving across the surface in order to give proper movement to the cursor or the like being operated on the monitor screen as a result of the mouse movement.

I have now added features of construction such that I have provided for proper movement of the mouse and the addition of a calendar display or the like. I have spent considerable time studying and experimenting with various constructions for mouse pads. Most of the pads I have seen and experimented with myself are less than fully effective when attempts are made to incorporate a removable calendar display or the like. I have finally conceived and developed a structure which overcomes all of the deficiencies of all other structures for this purpose. I have accomplished this by taking a suitable rectangular pad of rubber or the like which has a surface suitable to accomplish the non-slip contact with a work surface such as a desk or the like. I next fasten a sheet of suitable slick plastic such as polyethylene or the like to the top side of the pad of rubber or the like. I then cut the pad of rubber or the like and the adhered plastic along three sides at a spaced distance from the outer edges and to that same spaced distance from the edge of the side which is not cut, which forms what amounts to a frame. I then fasten a sheet of transparent material suitable to operate a mouse to the top of the cut plastic frame. I then decorate the top edges of the frame. At this time, I now have a superior mouse pad the frame of which can be lifted and a desired calander or the like can be placed on the plastic. The frame is then closed and the calendar or the like will be seen through the transparent mouse operating surface.

It is an object of this invention to provide a mouse pad in which a calendar or the like can be seen through the operating surface;

Another object is to provide a mouse pad as described wherein a removable calendar or the like may be inserted under the operating surface of the pad;

Another object is to provide a mouse pad as described wherein the mouse pad operating surface is supported by hard slick surface which in turn is supported by a non-slip surface.

The foregoing and other objects and advantages of this invention will become apparent to those skilled in the art upon reading the description of a preferred embodiment, which follows, in conjunction with a review of the appended drawings.

BRIEF DESCRIPTION OF THE DRAWINGS

FIG. 3 is a perspective of the mouse pad of FIGS. 1 and 2 open with the calendar in place; and FIG. 4 is a greatly enlarged section on 4—4 on FIG. 1 with a portion broken out.

DESCRIPTION OF A PREFERRED EMBODIMENT

Figure 1:
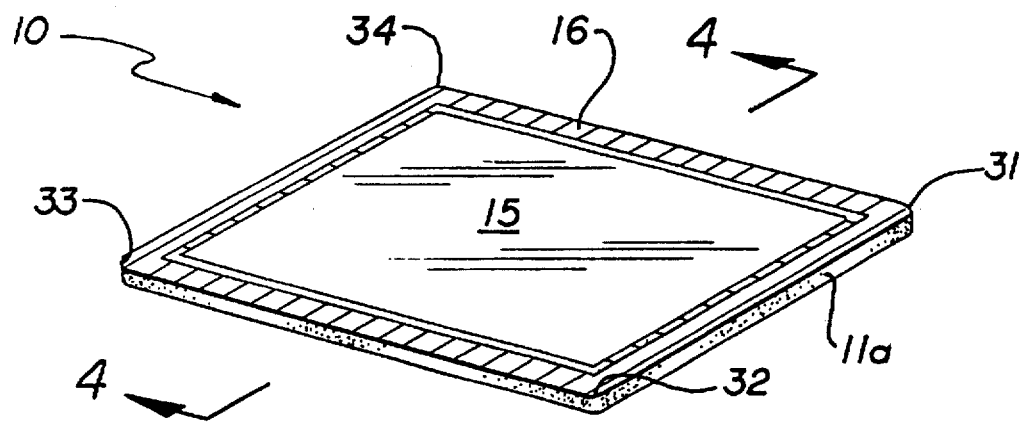
FIG. 1 is a perspective of a mouse pad formed by the method of this invention.

A computer mouse pad 10 formed by the method of this invention is shown in FIG. 1. The other figures also illustrate this pad. The invention will best be understood by viewing all figures.

FIG. 4 shows the construction of this mouse pad. A suitable rectangular sheet of rubber or the like 11 which will not slide when placed on a working surface and which is known to those skilled in the art has a sheet of suitable hard surface plastic such as polyethylene or the like 13 bonded to its top side by adhesive 12 or otherwise so adhered The combination of the materials 11, 12, and 13 has been cut at 40 around three sides to form the frame-like edgings 11a of the rubber or the like 11 (which include the portions 12a and 13a of the adhesive 12 and hard surface material 13).

A sheet of transparent PVC (polyvinyl chloride) or the like (material suitable to be used as the mouse traveling surface) 15 is bonded by adhesive 14 (or other suitable bonding) to the uncut side 50 of the entire item and adhesive or the like 14a to the cut edgings 11a (including 12a and 13a).

The area 40a is the space in which a calendar 20 or the like is placed.

The corners 31, 32, 33 and 34 are rounded so as to avoid catching on sleeves or other clothing or material. A decorative border 16 of any suitable material such as paint or the like will be provided on the PVC or the like 15 over the edgings and at the undetached area 50.

Figure 2:
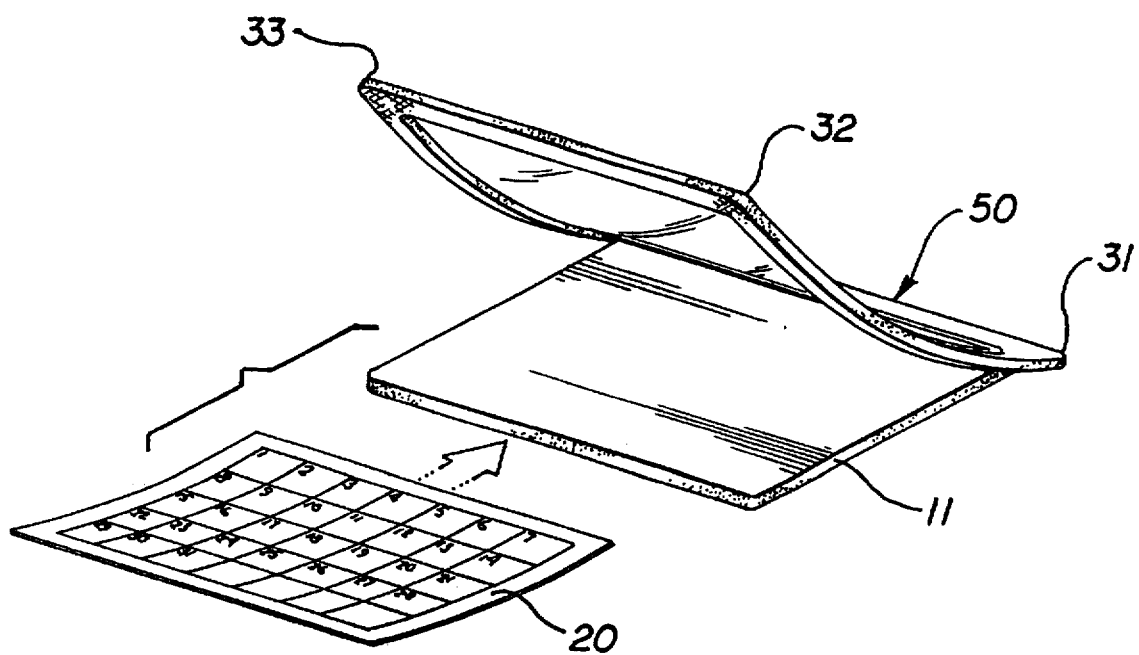
FIG. 2 is a partially exploded view of the mouse pad of FIG. 1 opened and a calander sheet about to be inserted.

In use, after the mouse pad of this invention has been made, a user will move the mouse across the PVC or the like 15 in a customary manner. When desired, the top of the pad will be lifted as shown in FIGS. 2 and 3 and calendar or the like 20 will be placed as shown in FIG. 3. The PVC or the like 15 fastened to the cut edgings will then be closed to form the flat pad 10 as shown in FIG. 1 (the calendar is not shown in this view as the pad may be used either with or without calendar 20, or with variations thereof.

While the embodiments of this invention shown and described are fully capable of achieving the objects and advantage desired, it is to be understood that such embodiments are for purposes of illustration only and not for purposes of limitation.

I claim:

1. The method of making a computer mouse pad comprising: cutting a first rectangular sheet of material which has a top surface, a bottom surface which will resist slipping on a work surface and four sides; bonding a second rectangular sheet of hard surface material having the same planar shape as said first rectangular sheet of material to the top of said first rectangular sheet of material; forming a three sided frame-like edging by cutting a slot through said first rectangular sheet of material and said bonded second rectangular sheet of hard surface material along a line at a spaced distance from the edges of three sides of the first rectangular sheet of material and the bonded second rectangular sheet of hard surface material with the cuts being stopped at distances from the fourth side which are equal to the spaced distance of the slot from the edges; bonding a third rectangular sheet of transparent material, having a top surface suitable for operation of a computer mouse thereon and a bottom surface and having the same planar shape as the said first rectangular sheet of material, to the second rectangular sheet of hard surface material on the portion which has been cut into a three sided frame-like edging and on the portion of the fourth side of the bonded second rectangular sheet of transparent material which extends along the area defined by the length of the cuts to the outer edge of the fourth side; lifting the third sheet of material with the three sided frame-like material; placing a calendar sheet having the same planar shape and size as the second sheet of hard surface material within the area defined by the frame like edging and the joinder of the third transparent sheet to the hard surface material; and closing the three sided frame like edging down upon the material from which it was cut, thus holding the calendar in position such that the calendar cannot move without lifting the three sided frame-like edging.

* * * * *